United States Patent
Frazier et al.

(10) Patent No.: US 10,704,346 B2
(45) Date of Patent: Jul. 7, 2020

(54) APPARATUS, SYSTEM AND METHOD FOR SEPARATING COMPONENTS OF A SLURRY

(71) Applicant: M-I L.L.C., Houston, TX (US)

(72) Inventors: Evan T. Frazier, Covington, KY (US); Colin Stewart, Houston, TX (US); Richard Bingham, Katy, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/039,439

(22) PCT Filed: Nov. 26, 2014

(86) PCT No.: PCT/US2014/067625
§ 371 (c)(1),
(2) Date: May 26, 2016

(87) PCT Pub. No.: WO2015/081200
PCT Pub. Date: Jun. 4, 2015

(65) Prior Publication Data
US 2017/0022771 A1 Jan. 26, 2017

Related U.S. Application Data

(60) Provisional application No. 61/909,162, filed on Nov. 26, 2013, provisional application No. 61/909,163, (Continued)

(51) Int. Cl.
*B01D 21/00* (2006.01)
*E21B 21/06* (2006.01)
(Continued)

(52) U.S. Cl.
CPC ........ *E21B 21/067* (2013.01); *B01D 21/2494* (2013.01); *B01D 33/0346* (2013.01);
(Continued)

(58) Field of Classification Search
CPC .......................... B01D 21/00; B01D 21/2494; B01D 33/0346; B01D 33/82; B07B 1/28;
(Continued)

(56) References Cited

U.S. PATENT DOCUMENTS 3,154,805 A   11/1964  Egee et al.
3,898,061 A *  8/1975  Brunato ............ B01D 19/0042
                                                  96/196

(Continued)

FOREIGN PATENT DOCUMENTS

CA          2712774 C      11/2011
DE          3927769 C1     11/1990
WO        2013/101254 A1    7/2013

OTHER PUBLICATIONS

International Search Report and Written Opinion for the cross referenced International patent application PCT/US2014/051496 dated Nov. 24, 2014.
(Continued)

*Primary Examiner* — T. Bennett McKenzie
(74) *Attorney, Agent, or Firm* — Jeffrey D. Frantz

(57) ABSTRACT

A system having a screen having an upper side and a lower side for separating drill cuttings and drilling fluid within a vibratory separator; a tray positioned below the screen for receiving the drilling fluid from the screen; a pressure differential generator coupled to the tray, the pressure differential generator configured to create a pressure differential between the upper side and the lower side through the screen to enhance the flow of drilling fluid through the screen; and a hose assembly coupling the pressure differential generator to a coupler, an inlet of the coupler being arranged perpendicularly between a first outlet coupled to a mist eliminator and a second outlet coupled to a tank.

3 Claims, 13 Drawing Sheets

Related U.S. Application Data filed on Nov. 26, 2013, provisional application No. 61/934,700, filed on Jan. 31, 2014, provisional application No. 61/945,824, filed on Feb. 28, 2014, provisional application No. 62/004,752, filed on May 29, 2014.

(51) Int. Cl.

| | | |
|---|---|---|
| *B07B 1/28* | (2006.01) | |
| *B07B 1/46* | (2006.01) | |
| *B07B 13/16* | (2006.01) | |
| *B01D 21/24* | (2006.01) | |
| *B01D 33/03* | (2006.01) | |
| *B01D 33/82* | (2006.01) | |
| *B07B 1/40* | (2006.01) | |

(52) U.S. Cl.
CPC ............... *B01D 33/82* (2013.01); *B07B 1/28* (2013.01); *B07B 1/46* (2013.01); *B07B 13/16* (2013.01); *E21B 21/065* (2013.01); *B07B 1/40* (2013.01)

(58) Field of Classification Search
CPC .. B07B 1/46; B07B 13/16; B07B 1/40; E21B 2021/006–007; E21B 21/01–015; E21B 21/067; E21B 21/065; E21B 21/00–18
USPC .......................................................... 95/254
See application file for complete search history.

(56) References Cited

U.S. PATENT DOCUMENTS

| | | | |
|---|---|---|---|
| 4,272,369 A | | 6/1981 | Love |
| 4,294,593 A | * | 10/1981 | Rehm ................ B01D 19/0057 96/160 |
| 4,350,591 A | | 9/1982 | Lee |
| 4,487,553 A | * | 12/1984 | Nagata .................... F04F 5/466 261/76 |
| 5,098,586 A | | 3/1992 | Rudolph |
| 5,161,409 A | * | 11/1992 | Hughes ................... E21B 21/08 250/255 |
| 5,595,654 A | | 1/1997 | Caughman, Jr. |
| 5,944,195 A | | 8/1999 | Huang et al. |
| 6,170,577 B1 | * | 1/2001 | Noles, Jr. ................ E21B 37/00 134/22.12 |
| 6,170,580 B1 | | 1/2001 | Reddoch |
| 6,214,092 B1 | * | 4/2001 | Odom ................ B01D 19/0042 210/188 |
| 6,533,946 B2 | | 3/2003 | Pullman |
| 6,910,411 B2 | | 6/2005 | Reddoch |
| 6,988,622 B1 | | 1/2006 | Victor |
| 7,704,299 B2 | | 4/2010 | Mueller et al. |
| 7,727,316 B2 | | 6/2010 | Mueller et al. |
| 8,025,152 B2 | | 9/2011 | Vasshus et al. |
| 8,882,891 B1 | * | 11/2014 | Williams ........... B01D 19/0042 95/258 |
| 2002/0104806 A1 | | 8/2002 | Pullman |
| 2004/0011749 A1 | | 1/2004 | Hutchinson et al. |
| 2005/0082236 A1 | | 4/2005 | Derrick et al. |
| 2008/0075606 A1 | | 3/2008 | Krohn |
| 2008/0078699 A1 | * | 4/2008 | Carr .................... B01D 33/009 209/233 |
| 2009/0301939 A1 | | 12/2009 | Sorensen |
| 2011/0284481 A1 | | 11/2011 | Pomerleau |
| 2012/0279932 A1 | * | 11/2012 | Pomerleau ........... B01D 29/117 210/785 |
| 2013/0074360 A1 | | 3/2013 | Pomerleau |
| 2013/0105412 A1 | | 5/2013 | Burnett |
| 2015/0048037 A1 | | 2/2015 | Frazier et al. |

OTHER PUBLICATIONS

International Search Report and Written Opinion for the equivalent International patent application PCT/US2014/067625 dated Mar. 2, 2015.
International Preliminary Report on Patentability for the equivalent International patent application PCT/US2014/067625 dated Jun. 9, 2016.
Extended Search Report for the cross referenced European patent application 14836897.0 dated Mar. 28, 2017.

* cited by examiner

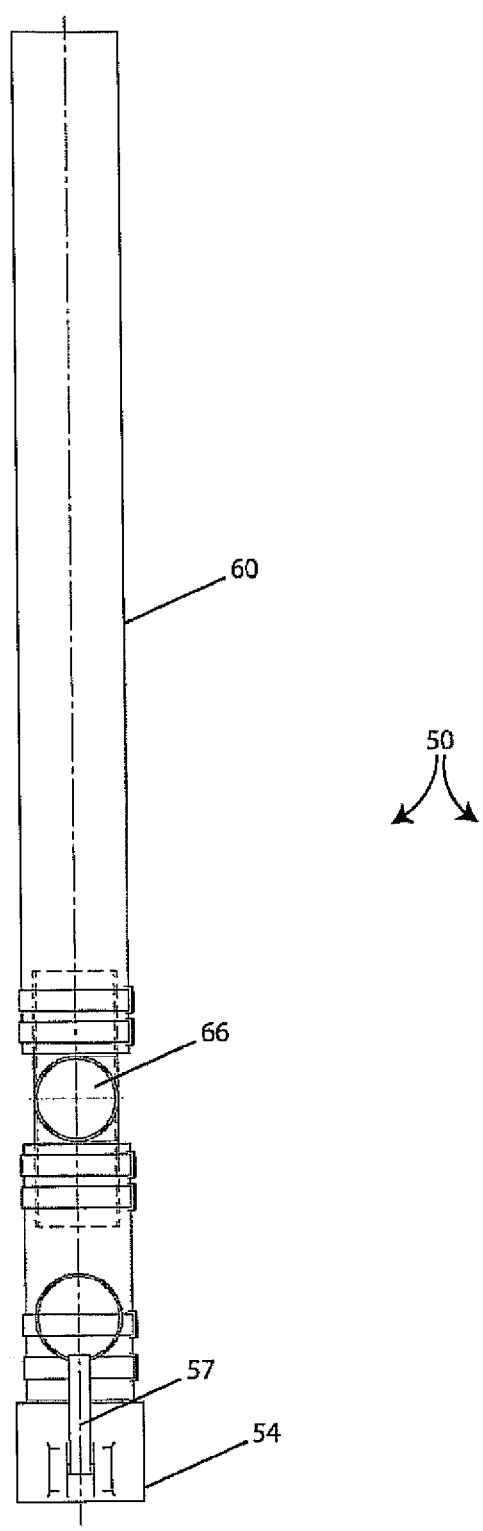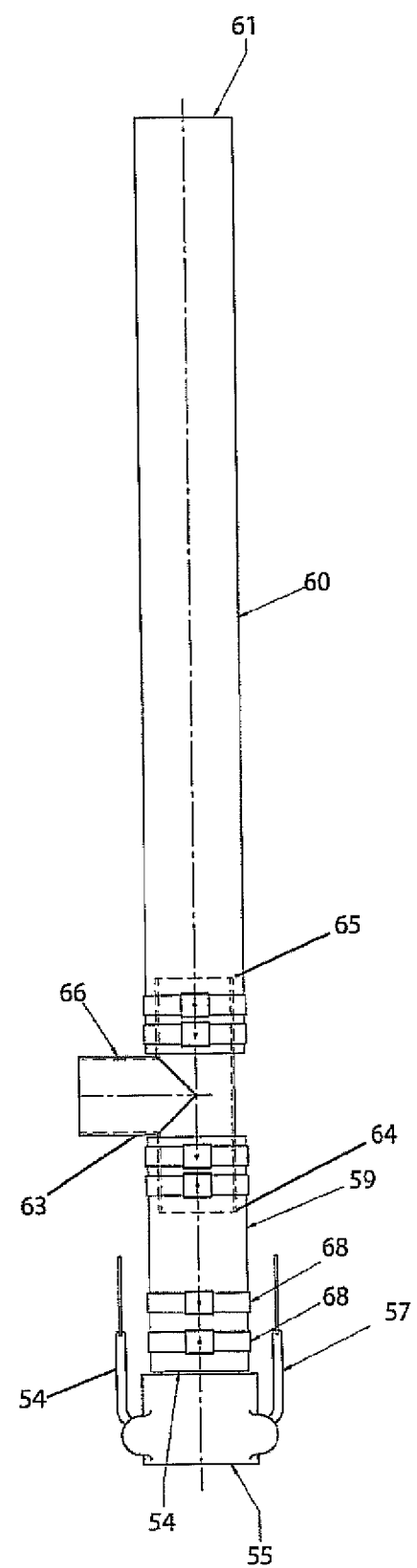
FIG. 8
FIG. 9

APPARATUS, SYSTEM AND METHOD FOR SEPARATING COMPONENTS OF A SLURRY

CROSS-REFERENCE TO RELATED APPLICATIONS

This Application claims priority from U.S. Provisional Application No. 62/004,752 filed on May 29, 2014; U.S. Provisional Application No. 61/945,824 filed on Feb. 28, 2014; U.S. Provisional Application No. 61/934,700 filed on Jan. 31, 2014; U.S. Provisional Application No. 61/909,162 filed on Nov. 26, 2013; and U.S. Provisional Application No. 61/909,163 filed on Nov. 26, 2013, and the disclosures of each provisional patent application identified is incorporated herein by reference in its entirety.

BACKGROUND

Various industries, such as oil and gas, mining, agriculture and the like utilize equipment and/or methods to separating fluids from materials. For example, in the mining industry, the separation of a desired mineral component from the undesirable gangue of an ore is a necessary and significant aspect of mining. Tailings are the materials left over after the process of separating the valuable ore from the gangue. Mine tailings are usually produced from a mill in slurry form that is typically a mixture of fine mineral particles and water.

Another example of such a separation method is found in the oil and gas industry. For example, oilfield drilling fluid, often called "mud," serves multiple purposes in the oil and gas industry. Among its many functions, the drilling mud acts as a lubricant for a drilling bit and increases rate of penetration of the drilling bit. The mud is pumped through a bore of the drill string to the drill bit where the mud exits through various nozzles and ports, lubricating the drill bit. After exiting through the nozzles, the "spent" fluid returns to the surface through an annulus formed between the drill string and the drilled wellbore. The returned drilling mud is processed for continued use.

Another significant purpose of the drilling mud is to carry the cuttings away from the drill bit to the surface. The drilling fluid exiting the borehole from the annulus is a slurry of formation cuttings in drilling mud, and the cutting particulates must be removed before the mud is reused.

One type of apparatus used to remove cuttings and other solid particulates from drilling mud is commonly referred to in the industry as a "shaker" or "shale shaker." The shaker, also known as a vibratory separator, is a vibrating sieve-like table upon which returning used drilling mud is deposited and through which substantially cleaner drilling mud emerges.

The shakers use filtration screens to separate drill cuttings from drilling fluid in on-shore and off-shore oilfield drilling. The separating screens have a mesh stretched across a frame. The mesh allows particles and/or fluid below a predetermined size to pass through the separating screen. The separating screen is vibrated while the mixture of particles and/or fluids is deposited on an input side. The vibration improves separation and conveys the remaining particles to a discharge end of the separating screen.

To increase efficiency of the particles and/or fluid passing through the screen, an external vacuum system may be placed between the screen and the sump. The vacuum system generates a pressure differential through the screen. However, applying the pressure differential may cause air to be entrained within the fluid exiting the tray. The entrained air may cause misting of the liquid, thereby losing fluid that could otherwise be recycled to the drilling operation and providing a hazardous work environment. Additionally, the vacuum may be applied intermittently to the bottom surface of the screen creating a dead-head situation or allow fluid to backflow through the screen.

BRIEF DESCRIPTION OF DRAWINGS

The foregoing and other features of the present disclosure will become more fully apparent from the following description, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

FIG. 8 is a top view of the hose assembly of FIG. 7;

FIG. 9 is a side view of the hose assembly of FIG. 7;

DETAILED DESCRIPTION

Figure 1:
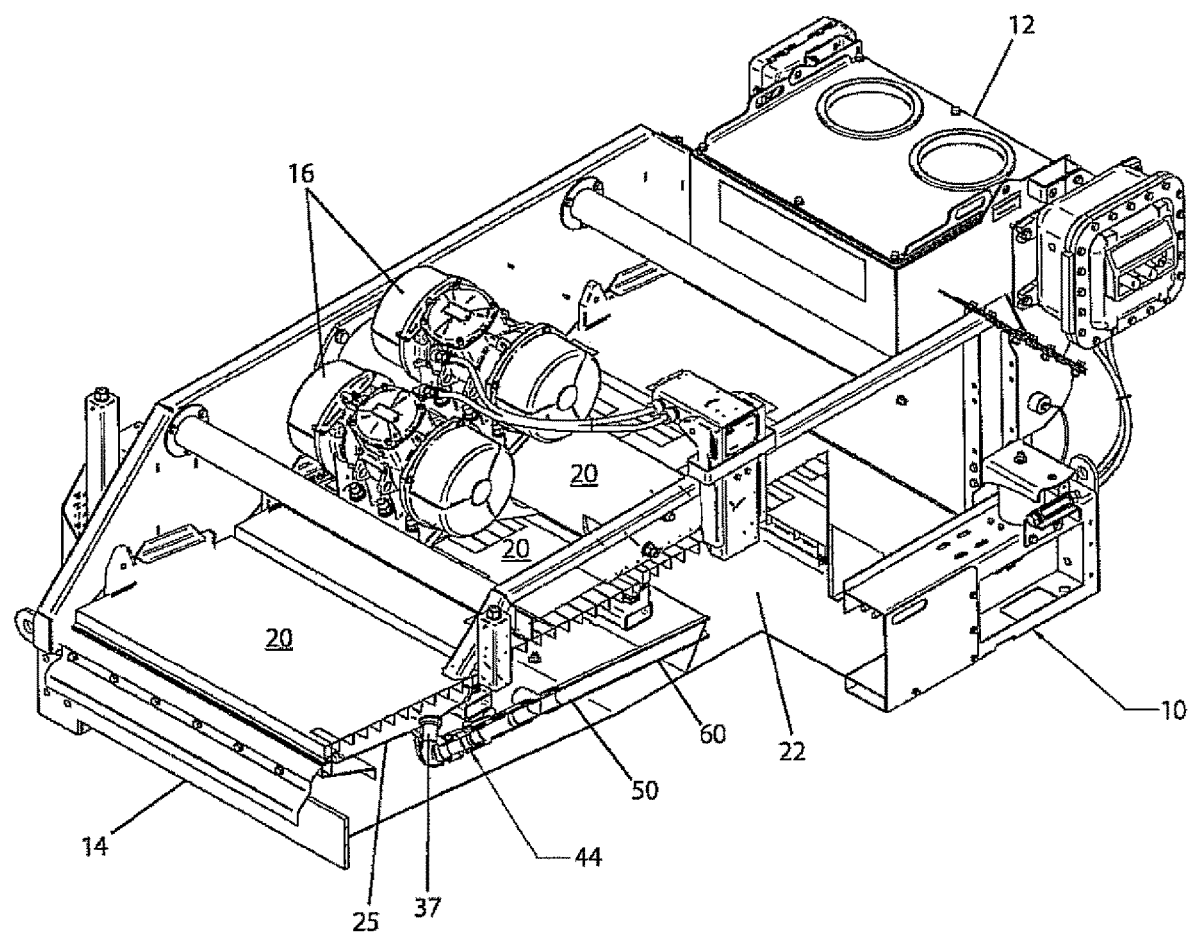
FIG. 1 is a partial cut-away perspective view of a vibratory separator in accordance with embodiments disclosed herein in accordance with embodiments disclosed herein.

In the following detailed description, reference is made to the accompanying drawings. In the drawings, similar symbols or identifiers typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to systems, devices, apparatus, and/or methods related to separating components of a slurry, particularly slurry exiting from a vibratory separator under vacuum. In some embodiments, the method may include removing entrained air from the discharge from a shaker. In some embodiments, the vibratory separator may include composite vacuum trays.

Referring now to FIG. 1, a separator 10 in accordance with embodiments disclosed herein is illustrated. The separator 10 may have an inlet end (or feed end) 12 for receiving a slurry of cuttings and wellbore fluid and an outlet end (or discharge end) 14. Wellbore fluid as used herein shall refer to hydrocarbons, drilling fluid, lost circulation material or other fluids or substances present in the wellbore. The separator 10 may have motors 16 to generate and/or impart vibrational motion to the separator 10. The separator 10 may also have screens 20 for separating the components of the slurry. The slurry of cuttings (solids) and drilling fluid may enter the inlet end 12 of the separator 10 and pass over the screens 20. The slurry may be conveyed within the separator 10 toward the outlet end 14. The vibratory motion imparted by the motors 16 may aid in conveying the slurry through the separator 10. Drilling fluid from the separation process of the separator 10 may be collected in a sump 22 located at the lower part of the separator 10.

As shown in FIGS. 1-4, the separator 10 may have a tray 25. The tray 25 may act as a capture device for wellbore fluid of the slurry. As shown, the tray 25 may be generally rectangular in shape. However, the tray 25 may be any shape and size to operate within or attach to the separator 10. The tray 25 may have a thickness defined between a top 27 and a bottom 29. The tray 25 may be formed of metal, composite, or other materials as will be appreciated by a person having ordinary skill in the art. The tray 25 may be molded as a unitary component or formed from multiple components attached or otherwise secured together. The tray 25 may be stamped into a desired shape and/or formed using any known fabrication technique. The tray 25 may be configured to receive the screen 20, for example, as shown in FIG. 1. The screen 20 may be generally rectangular in shape. Screen wedges 28 may be used to secure the screen 20 and/or the tray 25 within the separator 10.

The tray 25 may have a lip 31 located on peripheral edges of the tray 25. Thus, the lip 31 may extend about the periphery of the tray 25. The lip 31 may be located in a position above an interior area 33 of the tray 25. The lip 31 may define the interior area 33 of the tray 25. The interior area 33 of the tray 25 may have surfaces 35 that angle away from the lip 31 and downward with respect to the lip 31 toward a location inside a periphery defined by the peripheral edges of the tray 25. The surfaces 35 may force or direct the wellbore fluid passing through the screen 20 into a drain port 37. While the drain port 37 is illustrated as circular, the drain port 37 may be any shape, such as but not limited to elliptical, helical, octagonal, hexagonal, and or any desired shape.

Figure 3:
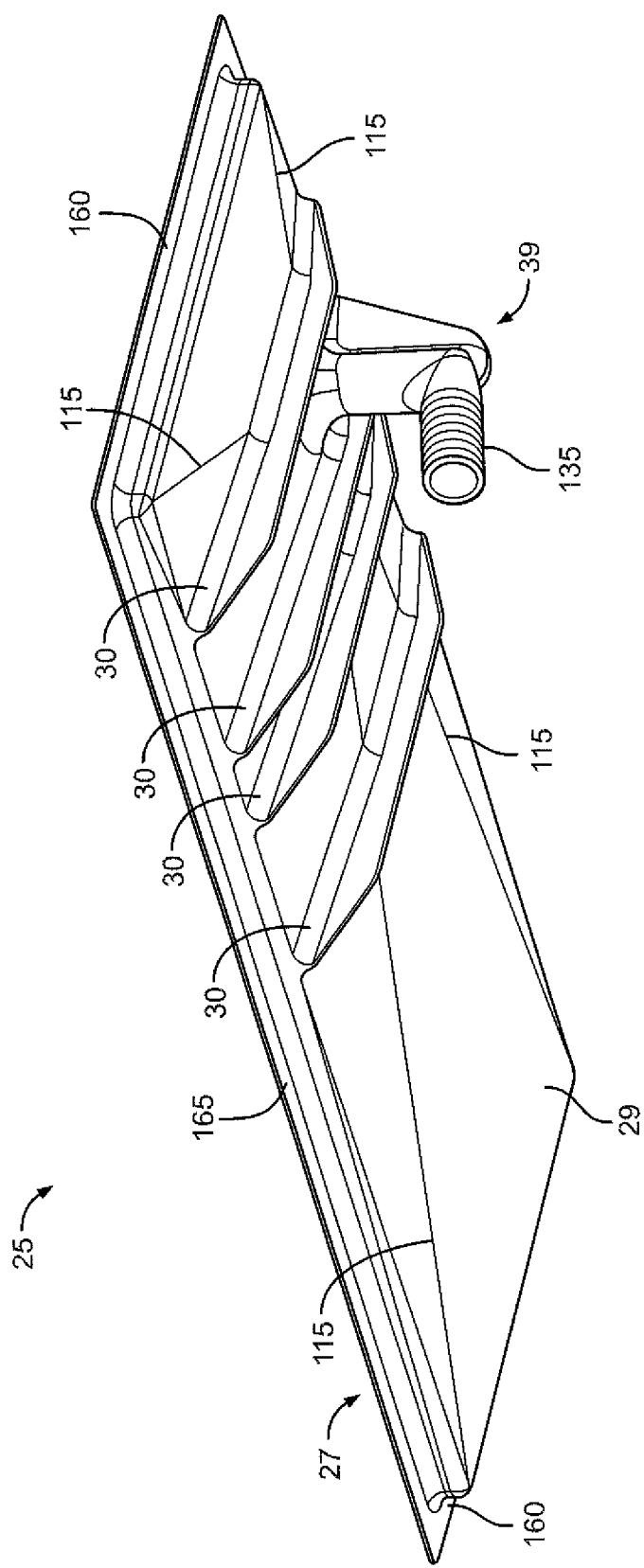
FIG. 3 is a bottom perspective view of a composite vacuum tray for use in the vibratory separator in accordance with embodiments disclosed herein.
Figure 4:
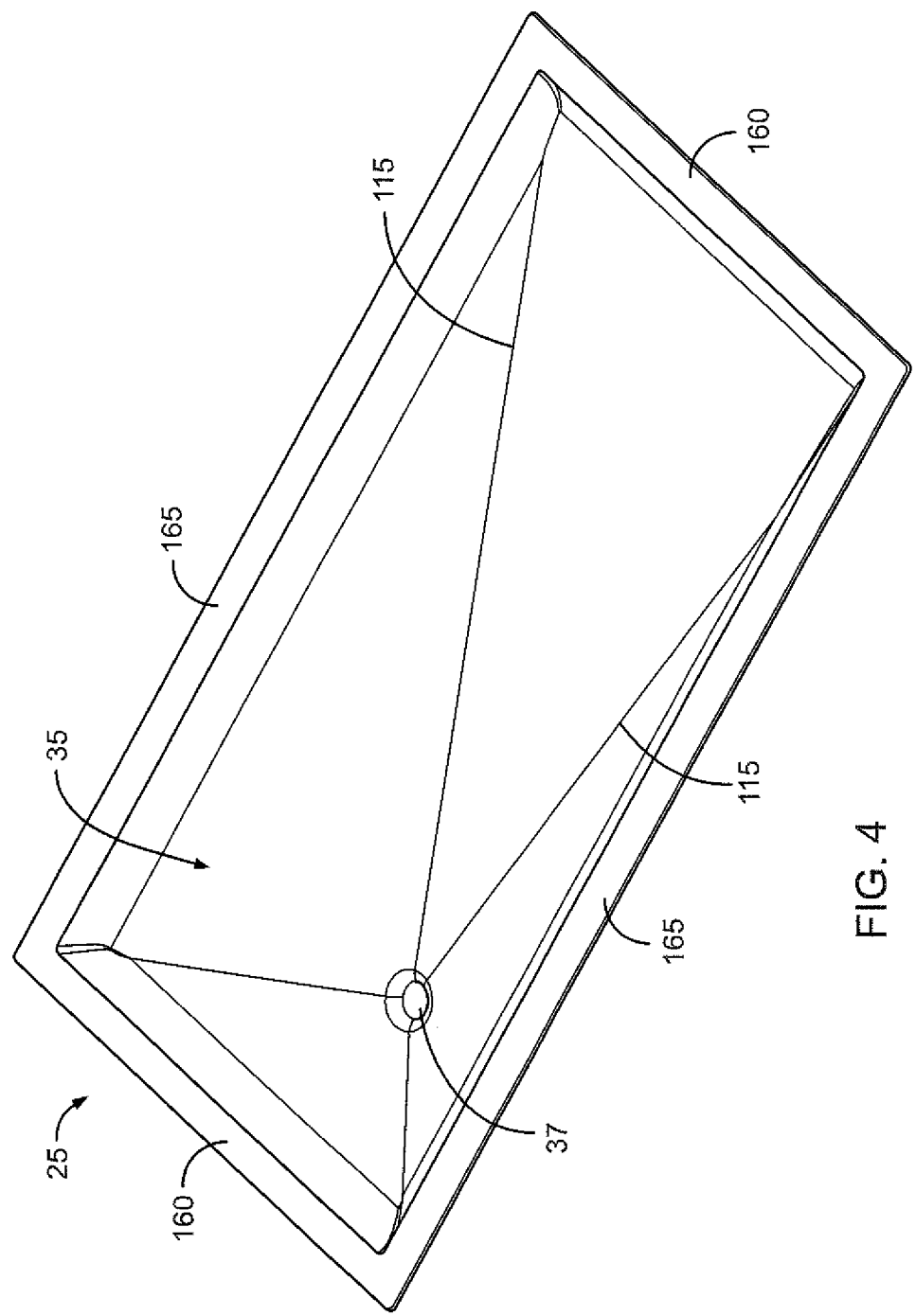
FIG. 4 is a top perspective view of the composite vacuum tray of FIG. 3.

As further shown in FIGS. 3-4, in some embodiments, the tray 25 may be a composite vacuum tray. The composite vacuum tray 25 may be formed from a composite material. Composite materials may be more than 50% lighter weight than conventional metal vacuum trays, which increases the durability and strength of the vacuum tray, even under vibration. Some example composite materials may include, but are not limited to, carbon fiber, glass fiber, glass filled plastic, and other similar materials. For example, a carbon fiber composite vacuum tray 25 may include layers of carbon fiber material coupled together via a resin, adhesive, and/or other coupling material. Composite vacuum trays may be formed by a number a methods known to those of ordinary skill in the art of plastics manufacture.

The screen 20 may fit and/or seal with the lip 31 of the tray 25. Thus, the screen 20 may form a substantially air-tight and/or fluid-tight seal with the tray 25. The screen 20 may cover and/or may enclose the interior area 33 of the tray 25. The interior area 33 may receive drilling fluid which has passed through the screen 20. The interior area 33 and/or bottom surface 29 may be sloped such that the drilling fluid is substantially diverted toward the drain port 37. Slope lines 115 depict the slope of the composite vacuum tray 25 as substantially downward (i.e., the fluid is substantially diverted from the edges of the composite vacuum tray 25 toward the drain port 37). In this manner, the drilling fluid, with the assistance of one or more forces (e.g., gravity, manmade forces, pressure differential), may contact the interior area 33 and flow toward the drain port 37, wherever located.

In some examples, the interior area 33 and/or the bottom surface 29 may be a polished surface. This may reduce the amount of fluid or other material sticking to and/or building up on the composite vacuum tray 25. In some examples, a mold used to manufacture the composite vacuum tray 25 may have polished surfaces such that the composite vacuum tray 25 created in the molding process will also have polished surfaces.

Tray 25 may include at least one coupler 39. The coupler 39 may be integrated with and/or integrally formed into composite vacuum tray 25 at the drain port 37, i.e., the tray 25, the drain port 37 and the coupler 39 are integrally formed. In this manner, the composite vacuum tray 25 integrated with the coupler 39 reduces the number of potential points of failure that exist with conventional vacuum trays because of the lack of weld or bolt joints. In some examples, composite vacuum tray 25 and the coupler 39 may be constructed separately and coupled (e.g., fused) together at the drain port 37. The coupler 39 may be capable of withstanding a pressure differential. The coupler 39 may be positioned anywhere between sides 160 and anywhere between sides 165 of the composite vacuum tray 25. However, some locations may better reduce stress on the coupler 39 than other locations. In some examples, the coupler 39 may be off-centered, which may reduce stress by my more than 50% when compared to conventional centered locations.

In some embodiments, the coupler 39 may be set close to one or more of the sides 160, 165 of the composite vacuum tray 25. In some examples, the coupler 39 may be located in the range of between about 5 to about 50% of the distance between the sides 160. In some examples, the coupler 39 may be located in the range of between about 10 to about 35% of the distance between the sides 160. In some examples, the coupler 39 may be located in the range of between about 5 to about 50% of the distance between the sides 165. In some examples, the coupler 39 may be located in the range of between about 10 to about 35% of the distance between the sides 165. As depicted in FIG. 4, the coupler 39 may be located in the range of between about 20 to about 33% of the distance between the sides 160 and in the range of between about 20 to about 33% of the distance between the sides 165.

Figure 2:
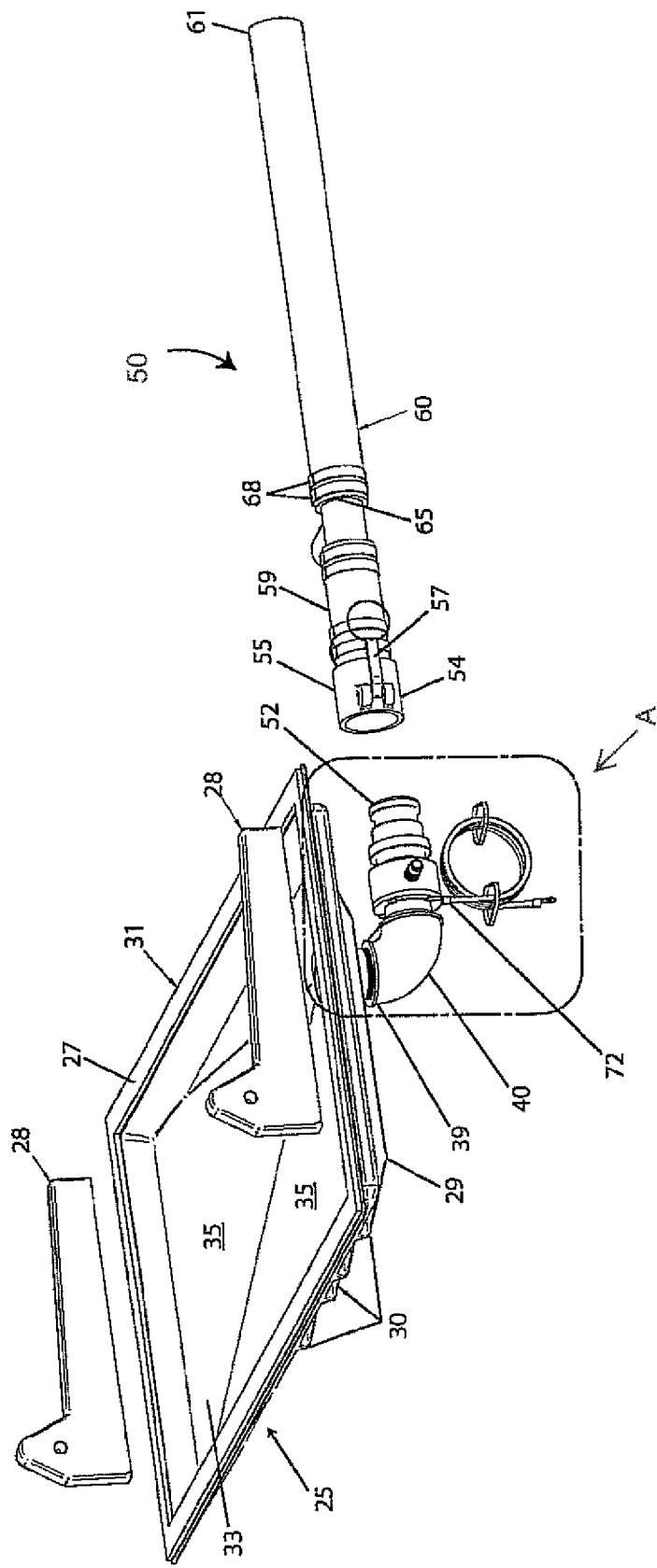
FIG. 2 is an exploded view of a tray and a hose assembly for use in the vibratory separator in accordance with embodiments disclosed herein.
Figure 6:
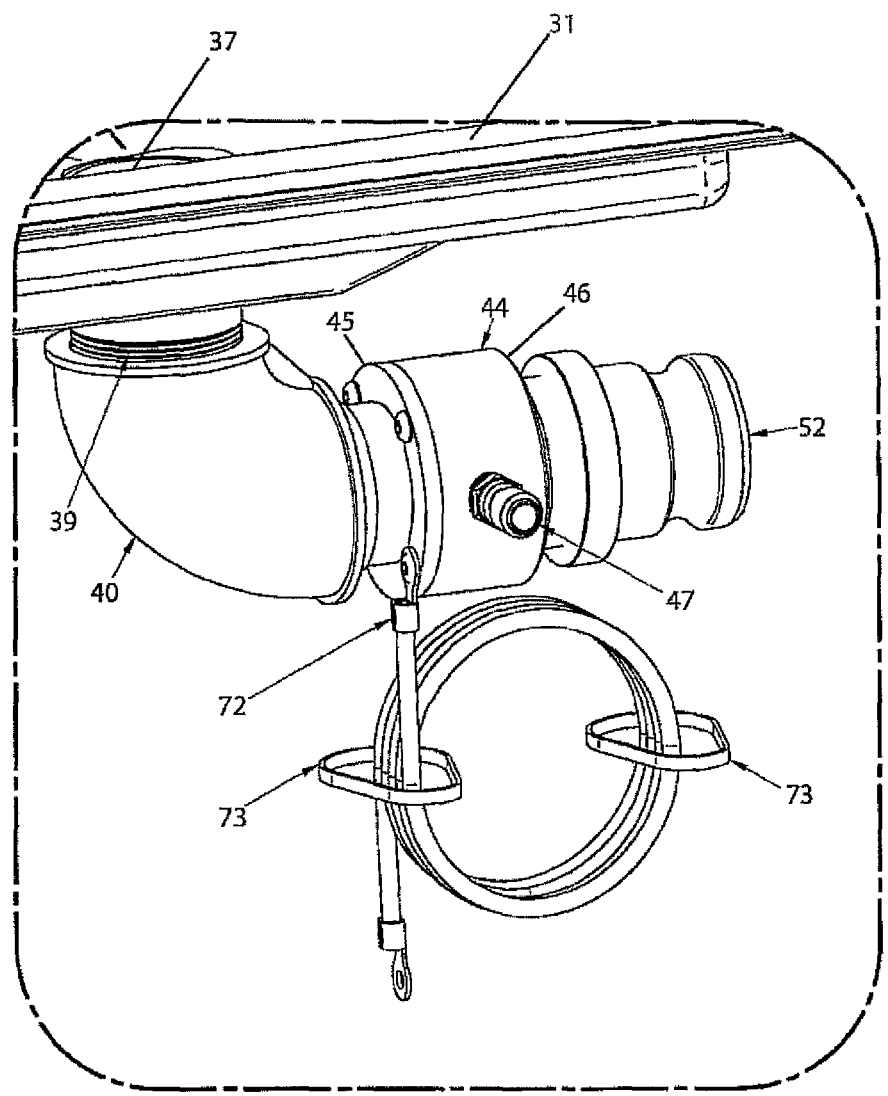
FIG. 6 is a detail view taken from within region A of FIG. 2.

The coupler 39 may extend substantially downward from the composite vacuum tray 25. This may allow the fluid to exit the composite vacuum tray 25 through the drain port 37 and via the coupler 39. In some embodiments, (such as shown in FIGS. 2 and 6), the coupler 39 may extend vertically downward from the composite vacuum tray 25. In some examples (such as shown in FIG. 3), the coupler 39 may first extend vertically downward from the composite vacuum tray 25 and then angle (e.g., fixed 45° angle, fixed 90° angle, adjustable angle).

In some examples, barb(s), fitting(s), threaded fitting(s), coupler(s), and/or hose(s) may be coupled to and/or molded onto the coupler 39. For example, the composite vacuum tray 25 shown in FIG. 3 includes a coupler having barb(s) 135 molded thereon or integrated therein. In another example, the composite vacuum tray 25 shown in FIG. 6 includes a coupler 39 having a threaded fitting molded thereon or integrated therein. The coupler 39 may be constructed from materials such as steel, stainless steel, brass, PTFE, PVC, nylon, bronze, and/or cast iron, for example.

As shown in FIG. 3, in some examples, ridges 30 may be integrated into the composite vacuum tray 25. The ridges 30 may increase rigidity and/or structural integrity to the composite vacuum tray 25, this increasing strength and/or reliability of the composite vacuum tray 25. The ridges 30 may be integrated with and/or integrally formed into composite vacuum tray 25. In some examples, composite vacuum tray 25 and the ridges 30 may be constructed as one piece. In some examples, composite vacuum tray 25 and the ridges 30 may be constructed separately and coupled (e.g., fused) together.

In some examples, gasket(s) (not shown) may be molded with or into and/or fused with lip 31 of the composite vacuum tray 25, either on the top and/or bottom of the lip 31. By incorporating the gasket into the composite vacuum tray 25, adhesives may not be necessary. When adhesives are used to glue the gasket to the composite vacuum tray 25, the gasket typically falls off when exposed to drilling fluids, a well know problem in the oilfield. The bond between an integrated gasket of the composite vacuum tray 25 and the screen and/or shaker may be more reliable.

Figure 5:
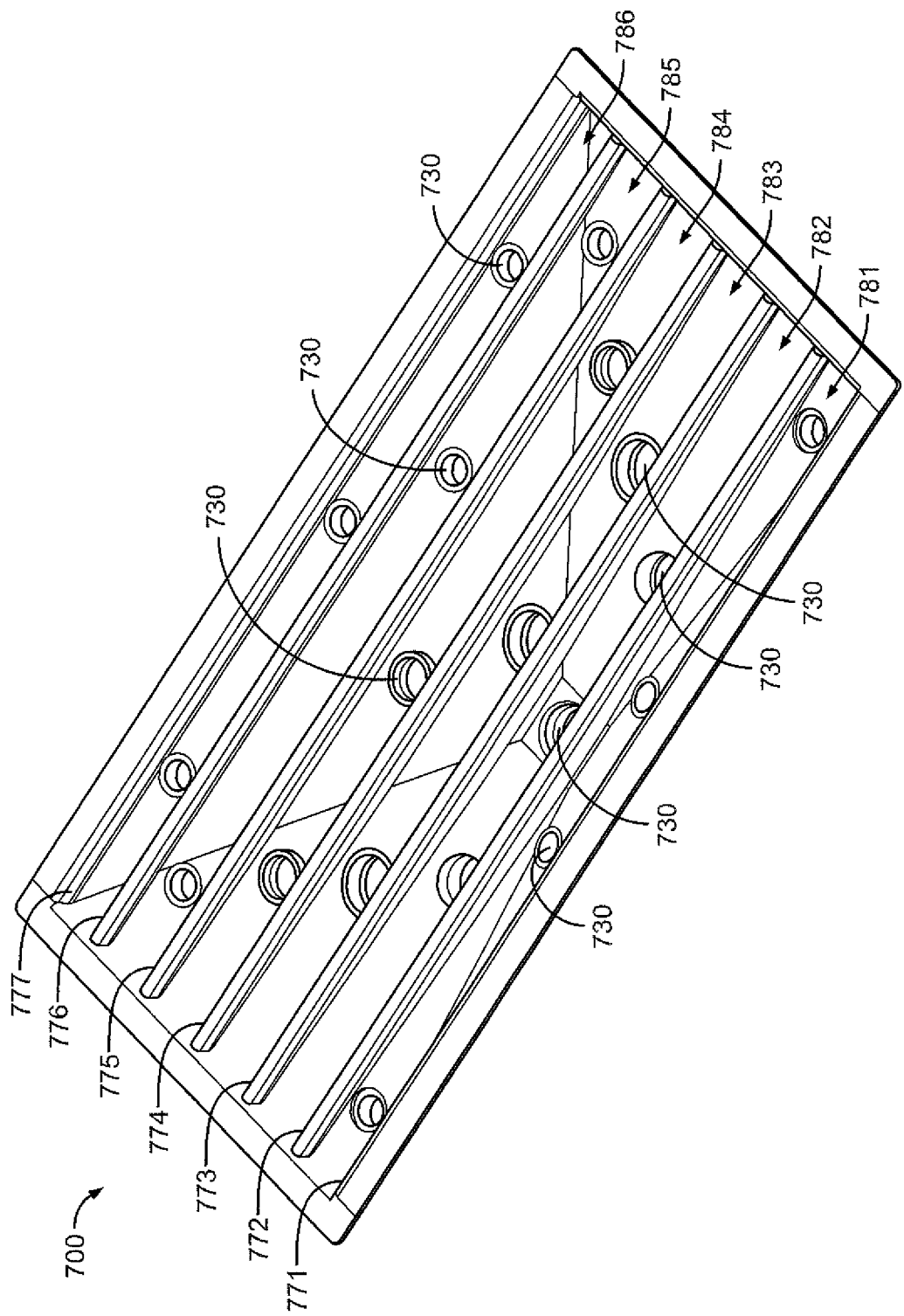
FIG. 5 is a top perspective view of a partitioned composite vacuum tray for use in the vibratory separator in accordance with embodiments disclosed herein.
Figure 7:
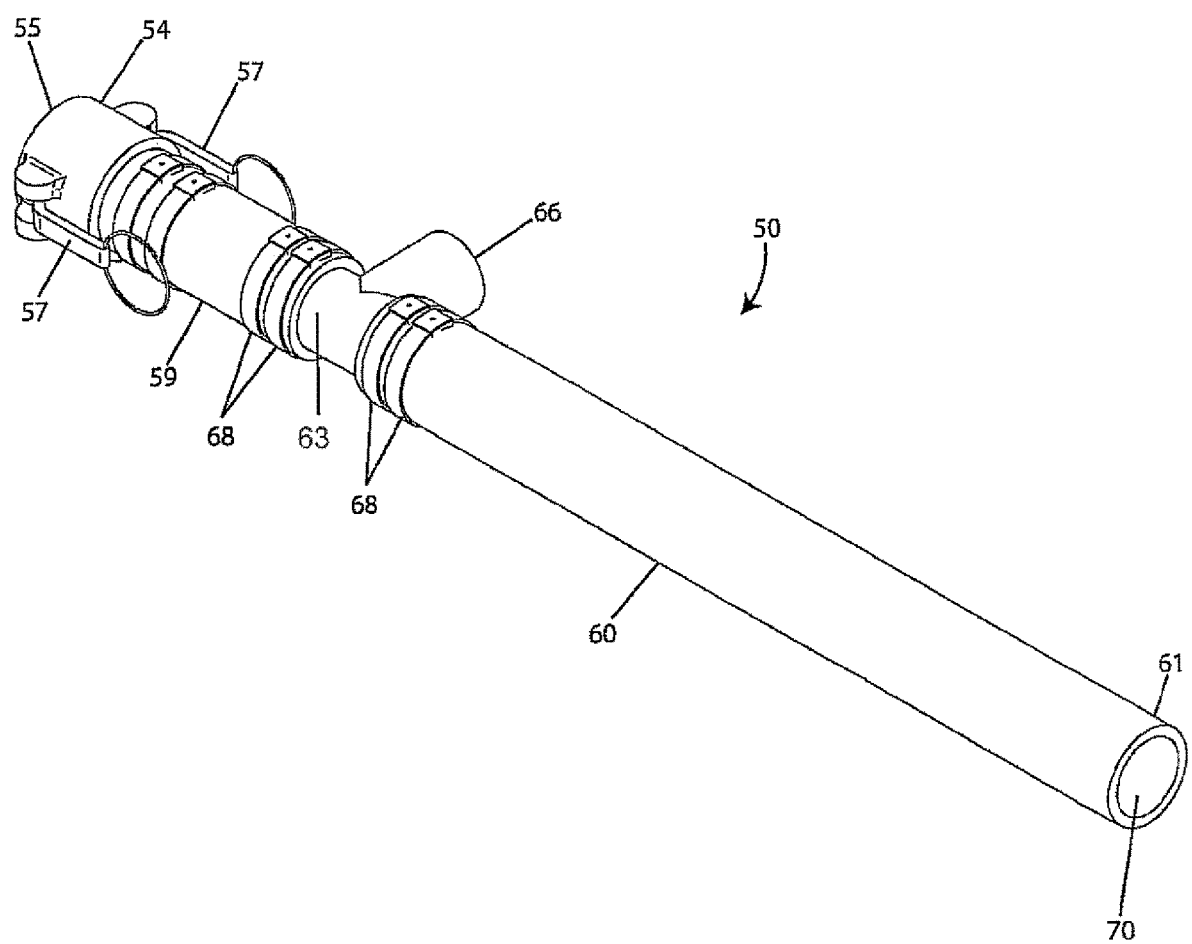
FIG. 7 is a perspective view of a hose assembly in accordance with embodiments disclosed herein.

FIG. 5 shows another embodiment of a composite vacuum tray. The composite vacuum tray 700 may include partition(s) creating compartments within the interior area 33 of the composite vacuum tray 700. The composite vacuum tray 700 of FIG. 7 may include partitions 771, 772, 773, 774, 775, 776, 777, which form compartments 781, 782, 783, 784, 785, 786. Compartment 781 is defined by between partition 771 and partition 772, compartment 782 is defined by partition 772 and partition 773, and so on.

In some embodiments, the composite vacuum tray 700 having multiple compartments may have a common drain port 37 (as shown in FIGS. 1-4) and a common coupler 39. In other embodiments, the composite vacuum tray 700 having multiple compartments may have a coupler 730 in each compartment and a common drain port 37 which may be coupled to the coupler 39. The couplers 730 in each compartment may be located a distance above the drain port 37. The couplers 730 in each compartment may be located a within the composite vacuum tray 700 or may be located external to the composite vacuum tray 700.

In some embodiments, the composite vacuum tray 700 (such as shown in FIG. 5) having multiple compartments may have each compartment including several couplers 730 (for viewing clarity, only some of the many couplers 730 are labeled in FIG. 5) and a common drain port 37. These couplers 730 may act as drain ports or may be used to provide a vacuum above the tray 700. In this manner, depending on the application, forces (e.g., pressure differential) may be applied to each compartment individually and/or together to increase fluid flow to the composite vacuum tray 700. Similarly, forces (e.g., pressure differential) may be applied via each coupler 730 individually and/or together to increase fluid flow to the composite vacuum tray 700. If the couplers 730 are not connected to have a forces applied thereto, fluid may exit the composite vacuum tray 700 via the couplers 730 and into the sump 22.

In use, a pressure differential may be applied to the composite vacuum tray 25. For example, pressure differential forces may be applied via an external pressure differential source or via a pressure differential source integrated into the composite vacuum tray (e.g., molded into coupler 39 or 730). Pressure differentials, for example, may be continuous, pulsed, variable, and/or progressive to the tray 25. For composite vacuum trays 700, pressure differentials, for example, may be continuous, pulsed, variable, and/or progressive. For example, composite vacuum tray 700 having two partition(s) may be used in many different ways. Two partitions may create three compartments (i.e., compartment A, compartment B, and compartment C) in the composite vacuum tray 700. In another example, compartment A, compartment B, and compartment C may all have continuous pressure differential force(s) applied thereto. This continuous pressure differential may be the same for all compartments or may be a different continuous pressure differential for each compartment. In another example, compartment A, compartment B, and compartment C may all have pulsing pressure differential force(s) applied thereto. This pulsing pressure differential force may be the same for all compartments or may be a different pulsing pressure differential for each compartment. In yet another example, compartment A, compartment B, and compartment C may all have variable pressure differential force(s) applied thereto. This pressure differential variable force may be the same for all compartments or may be a different variable pressure differential for each compartment. In yet even another example, compartment A, compartment B, and compartment C may have progressive pressure differential force(s) applied thereto. For example, compartment A may have a first pressure differential force applied to it, while compartment B may have a second pressure differential force (greater than the first force) applied to it, and compartment C may have a third pressure differential force (even greater than the second force) applied to it.

In some embodiments, in addition to the vibratory motion, a pressure differential may be applied to the tray 25. As shown in FIGS. 1 and 6, the coupler 39 may be connected to an elbow 40 which may be connected to a pressure differential generator 44. The pressure differential generator 44 may have a first end 45 and a second end 46. The pressure differential generator 44 may have a fluid inlet 47. The fluid inlet 47 may be connected to a fluid source. The fluid may be clean or unclean drilling fluid, air, water, or any other fluid that may be desired based on the use of the separator 10. In the event that the fluid is air, the source may be an air compressor and/or the like. As shown, the pressure differential generator 44 may be connected to the drain port 37 of the tray 25 via the coupler 39. The wellbore fluid slurry, including solids and drilling fluid, to be separated may be deposited on the screen 20 in the separator 10. The pressure differential generator 44 creates a pressure differential across the screen 20 and may pull or draw drilling fluid from the slurry along with surrounding air through the screen 20. As a result, the drilling fluid and surrounding air may be pulled through the screen 20 and onto the interior area 33 of the tray 25 at a greater rate and/or volume than possible without the pressure differential. The drilling fluid and air that has passed through the screen 20 may then exit the drain port 37 of the tray 25. In some embodiments, the tray 25 and the pressure differential generator 44 may be integrally formed with the screen 20. The tray 25, the pressure differential generator 44, and the screen 20 may be molded together or may be constructed separated and coupled (e.g. fused) together. The pressure differential generator 44 may be positioned anywhere within the perimeter of the tray 25 and/or the screen 20.

In one embodiment, the pressure differential generator 44 may be an air amplifier, line vacuum, vacuum generator, blower or a device capable of generating a pressure differential by the use of fluid, such as by those that operate in accordance Bernoulli's principle, in particular the Venturi effect or the Coanda effect. The Venturi effect as used herein generally relates to increasing the velocity of the motive fluid provided from a fluid source from a decrease in cross-sectional area in the pressure differential generator 44. The Coanda effect as used herein generally relates to a stream of fluid attaching itself to a nearby surface and remaining attached even when the surface curves away from the initial jet direction. The fluid source may be connected to a fluid inlet through a conduit. A fluid control assembly in the conduit may control the flow of motive fluid to the pressure differential generator 44. The fluid control assembly may be a ball valve, a solenoid or any other fluid control device suitable for controlling compressed gas.

Figure 14:
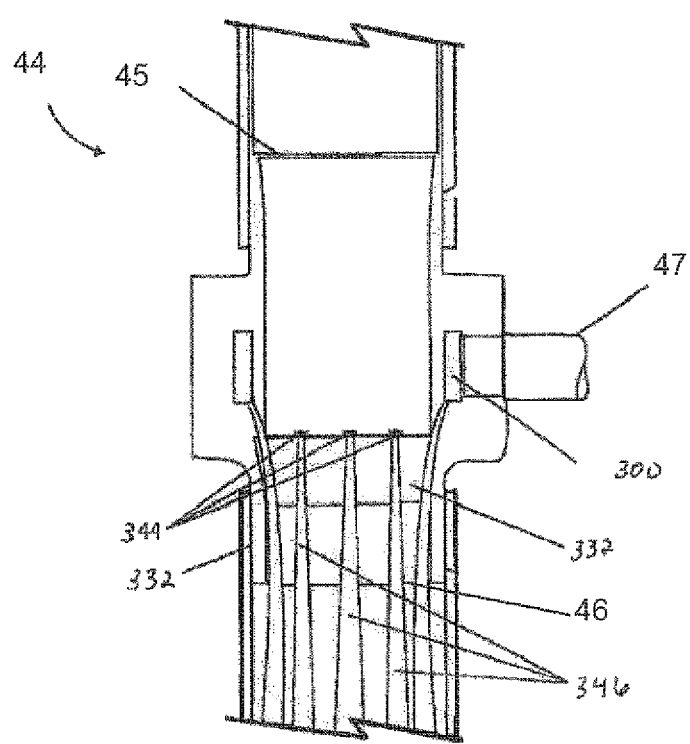
FIG. 14 is a cross-sectional view of a pressure differential generating device in accordance with embodiments disclosed herein.

In some embodiments, the pressure differential generator 44 is a vacuum generator, such as that shown in FIG. 14. As understood in the field of fluid dynamics, a velocity of a motive fluid increases as the fluid passes through a constriction in accordance with the principle of continuity. Likewise, the pressure of the motive fluid must decrease in accordance with the principle of conservation of mechanical energy. As a result, gains in kinetic energy of the motive fluid associated with its increased velocity through a constriction may be negated by the commensurate drop in pressure. As shown in FIG. 2, the pressure differential generator 44 creates a pressure differential, by, for example, narrowing the orifice through which fluid flows from the tray 25. The pressure differential generator 44 may draw a portion of the slurry (and surrounding air) through the screen 20 and may accelerate the portion of the drilling fluid to convey the drilling fluid. The pressure differential generator 44 may eject a small amount of the motive fluid to produce the pressure differential with a relatively higher output of the motive fluid at a second end 46 of the pressure differential generator 44. The pressure differential generator 44 may be constructed from aluminum, stainless steel, composite and/or another material. In an embodiment, the pressure differential generator 44 may provide maintenance-free operation since the pressure differential generator 44 may have no moving parts and/or may not require electricity to operate. In some embodiments, the pressure differential generator 44 may be such as those sold by Exair Corporation (Cincinnati, Ohio) or Nexflow Air Products Corp. (Richmond Hill, ON).

FIG. 14 illustrates an embodiment of the pressure differential generator 44, where the pressure differential generator 44 is, for example a vacuum generator or an in-line vacuum. The fluid from the fluid source may flow through a fluid inlet 47 into an annular plenum chamber 300. The fluid from the fluid source may then be injected into the nozzles 344. As a result, the fluid flowing into the nozzles 344 may generate fluid jets 346. The fluid jets 346 may create the pressure differential across the screen 20. For example, the pressure differential generator 44 may generate a pressure differential by narrowing orifices, i.e., the nozzles 344 in which the fluid from the fluid source flows.

Figure 15:
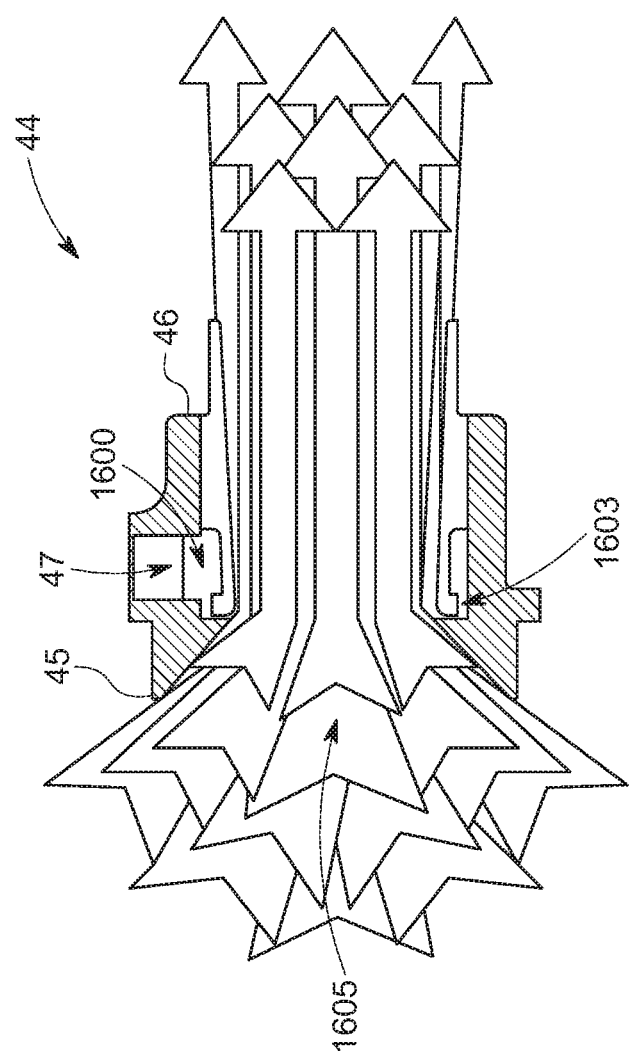
FIG. 15 is a cross-sectional view of a pressure differential generating device in accordance with embodiments disclosed herein; all arranged in accordance with at least some of the embodiments disclosed in the present disclosure.

FIG. 15 illustrates another embodiment of the pressure differential generator 44, such as an air amplifier. The fluid from the fluid source may flow through a fluid inlet 47 into an annular plenum chamber 1600. The fluid may be throttled through a small ring nozzle 1603 at high velocity. The fluid adheres to a Coanda profile and is directed to the second end 46. A low pressure is created at about the center 1605 of the pressure differential generator 44 inducing a high volume flow of surrounding air and drilling fluid from the tray 25 into the fluid from the fluid source. The combined flow of fluid and the surrounding air/drilling fluid to exhaust from the pressure differential generator 44 in a high volume, high velocity flow The pressure differential generator 44 may generate a pressure differential between a substantially full vacuum and a near zero vacuum depending on the fluid source. Any combination of vacuum and/or vacuum patterns (e.g., continuous, pulsed, variable, and/or progressive) may be applied consecutively, concurrently, and/or alternately.

Because the drilling fluid and air exiting the pressure differential generator 44 is at a high velocity, the drilling fluid mixture may exit the pressure differential generator 44 as a combination of a fluid and mist. To ensure that oil from the drilling fluid mixture is not dispersed to the atmosphere, the drilling fluid and air exiting the pressure differential generator 44 may be directed to the sump 22 via a hose assembly 50, as shown in FIG. 1. When the hose assembly 50 is submerged in the effluent in the sump 22, there is no exhaust path for the pressurized fluid utilized by the pressure differential generator 44, thereby creating a dead head situation. Further, the drilling fluid mixture in the sump 22 may reverse flow during a low vacuum condition such as when the fluid source is pulsed to a low level. During this condition, the drilling fluid mixture in the sump 22 may flow into the hose assembly 50 and may attempt to flow back to the pressure differential generator 44 and the screen 20.

Therefore, referring to FIGS. 2 and 7-9, the hose assembly 50 may be configured to reduce misting of the drilling fluid mixture and/or prevent creation of a deadhead situation. For example, the hose assembly 50 may have a first hose portion 59 located at a first end 55 and a second hose portion 60 located at a second end 61 of the hose assembly 50. A coupler 63 may have a first end 64 connected to the first hose portion 59 and a second end 65 connected to the second hose portion 60. The coupler 63 may have a port 66 arranged perpendicularly between the first end 64 and the second end 65, thereby forming a tee. The first end 64 and the second end 65 of the coupler 63 may be secured to the first hose portion 59 and the second hose portion 60, respectively, via one or clamps 68. In other embodiments, other means of coupling the first hose portion 59 and the second hose portion 60 to the coupler 63 may be used as known to one skilled in the art such as, but not limited to barb(s), fitting(s), and threaded fitting(s), coupler(s). In some embodiments, the port 66 may extend from the coupler 63 between the first end 64 and the second end 65. In other embodiments, the port 66 may be flush on the coupler 63 between the first end 64 and the second end 65

The port 66 in the hose assembly 50 is perpendicular to the drilling fluid mixture flow, allowing exhaust of some portion of the pressure differential fluid. The drilling fluid mixture may maintain sufficient velocity out of the pressure differential generator 44 to continue past the port 66 while allowing the some portion of pressurized fluid to exhaust from the port 66. The exhaust from the port 66 may also be sent to the sump 22. In some embodiments, the port 66 may have an oblique shape and may extend at an angle (e.g., fixed 45° angle, fixed 90° angle, adjustable angle) from the coupler 63, thereby forming a Y-connection. In some embodiments, the port 66 may be connected to a further hose to exhaust the pressurized fluid a distance from the sump 22.

During low pressure conditions, the port 66 may allow the reverse flow drilling fluid mixture to exit through the port 66 before reaching the pressure differential generator 44, preventing a dead-head situation.

Referring to FIGS. 1-2 and 6-9, the hose assembly 50 may be coupled to the pressure differential generator 44 via a cam lock 54. A first end 55 of the cam lock 54 may connect to a coupling cam adapter 52 coupled to the pressure differential generator 44. In some embodiments, latching arms 57 on the cam lock 54 may be used to secure the cam lock 54 to the coupling cam adapter 52. With the latching arms 57 in an unlatched position, the cam lock 54 is inserted into the coupling cam adapter 52 and the latching arms 57 moved to a latched position, thereby securing the cam lock 54 and the coupling cam adapter 52, i.e., coupling the hose assembly 50 to the pressure differential generator 44. In other embodiments, other means of coupling the pressure differential generator 44 to the hose assembly 50 may be used as known to one skilled in the art such as, but not limited to barb(s), fitting(s), and threaded fitting(s), coupler(s).

As shown in FIGS. 2 and 6, a grounding wire 72 may be connected to the pressure differential generator 44. The grounding wire 72 may have cable ties 73 to maintain the grounding wire 72 in a desired position. The grounding wire 72 may be electrically grounded to prevent static electricity build-up and potential spark and/or fire hazards. In one embodiment, the hose assembly 50 may be manufactured of electrically conductive materials. For example, the first hose portion 59 and the second hose portion 60 may have a conductive inner tube 70. The clamps 68, the coupling cam adapter 52 and the coupler 63 may be manufactured from stainless steel, brass and/or the like. As a result, the grounding wire 72 may prevent static electricity build-up that may be generated in the hose assembly 50.

Figure 10:
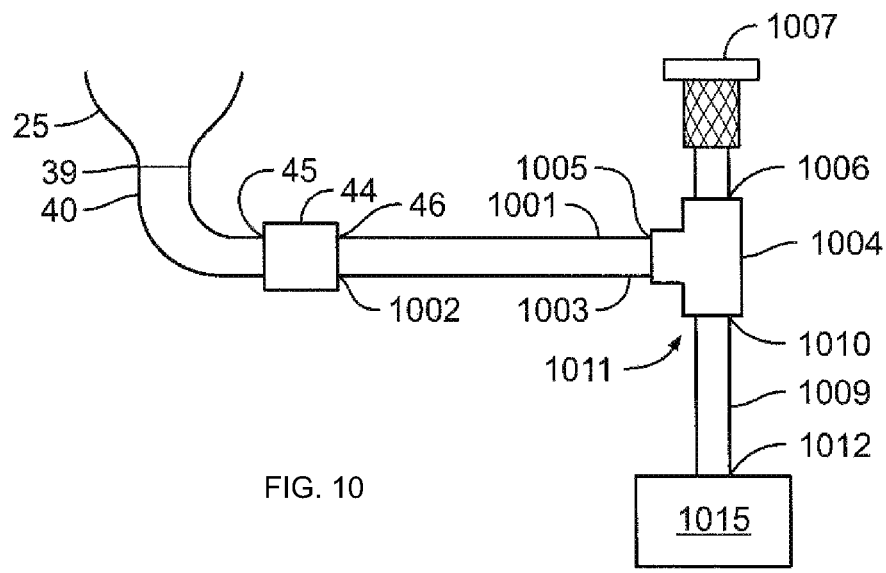
FIG. 10 is a schematic of a demisting system for use with the vibratory separator in accordance with embodiments disclosed herein.

In some embodiments, the high velocity drilling fluid mixture exiting the pressure differential generator 44 may be sent to a tank 1015 for collection as shown in FIG. 10. The pressurized air is separated from the drilling fluid mixture. The second end 46 (or the coupling cam adapter 52) of the pressure differential 44 may be coupled to a first end 1002 of a hose 1001. A second end 1003 of the hose 1001 may be a coupled to an inlet 1005 of a coupler 1004. The inlet 1005 of the coupler 1004 may be arranged perpendicularly between a first outlet 1006 and a second outlet 1010, thereby forming a tee. The first outlet 1006 of the coupler 1004 may be coupled to a mist eliminator 1007. The second outlet 1010 of the coupler 1004 may be coupled to a first end 1011 of a pipe 1009. A second end 1012 of the pipe 1009 may be submerged in the tank 1015 for collecting drilling fluid. When the high velocity fluid from the pressure differential generator 44 enters the coupler 1004, gravity acting on the drilling fluid mixture separates pressurized (and entrained) air towards the mist eliminator 1007 (e.g., exhaust) and drilling fluid towards the tank 1015. In some embodiments, the pipe 1009 should have about 4 feet measured from the first end 1010 of the pipe to the level of the fluid in the tank 1015. However, one of ordinary skill in the art will appreciate that the length of pipe 1009 may vary depending on, for example, a diameter of the pipe, sizing of the coupler 1004, desired volumetric fluid flow, etc. The tank 1015 may be any vessel known to one skilled in the art used in a system for processing or separating drilling fluid. In some embodiments, the hose 1001 may be coupled to other components via camlocks, or any known couplers known to one skilled in the art. In some embodiments, the second outlet 1010 of the coupler 1004 may be coupled directly to the tank 1015.

Figure 11:
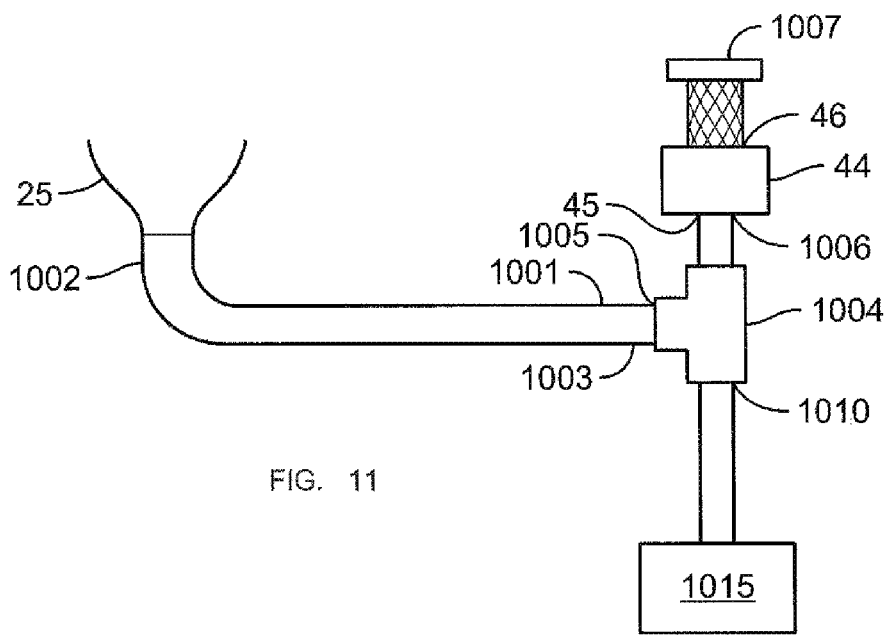
FIG. 11 is a schematic of a demisting system for use with the vibratory separator in accordance with embodiments disclosed herein.

Referring to FIG. 11, in another embodiment, the first end 1002 of the hose 1001 may be coupled directly the pressure differential generator 44 (see FIG. 6) or via the coupling cam adapter 52. The second end 1003 of the hose 1001 may be a coupled to the inlet 1005 of the coupler 1004. The first outlet 1006 of the coupler 1004 may be coupled to the inlet 45 of the pressure differential generator 44. The second end 46 of the pressure differential generator 44 may be coupled to the mist eliminator 1007. When the drilling fluid from the tray 25 enters the coupler 1004, gravity acting on the drilling fluid mixture separates entrained air towards the pressure differential generator 44 and the mist eliminator 1007 (e.g., exhaust) and drilling fluid towards the tank 1015.

In some embodiments, the mist eliminator 1007, also called a "demister," is used to reduce, remove and/or eliminate extraneous fluid particles from the flow of vapor. Mist eliminators provide a large surface area in a small volume to collect liquid without substantially impeding gas flow. Unlike filters, which hold particles indefinitely, mist eliminators coalesce (merge) fine droplets and allow the liquid to drain away. In some embodiments, the mist eliminator 1007 may be any apparatus that provides a surface on which liquid may coalesce and be separated from a vapor.

In some embodiments, the mist eliminator 1007 may be a static mixer. Static mixers have fluid moving through the mixer, not the mixer moving through the fluid. Static mixers may have static mixing elements therein. The static mixing elements may be any shape which provides a surface area for the liquid to coalesce on. In some embodiments, the static mixing elements are helical shaped. Mixing takes place around the centerline and in the direction of flow. The stream of fluid is split and forced to the opposite outside walls, creating a vortex along the centerline axis of the static mixer. The vortex is sheared and the process recurs with opposite rotation. This clockwise/counterclockwise motion drops the pressure of the high velocity fluid, thereby coalescing the fluid, wherein gravity will help the fluid drop to the tank 1015. In some embodiments, the mist eliminator 1007 may be such as those sold by Cole-Parmer (Vernon-Hills, Ill.) or StaMixCo LLC (Brooklyn, N.Y.).

In another embodiment, the mist eliminator 1007 may be an open-ended pipe having a helical screw therein. The helical screw (or any shape screw) provides a surface area for the liquid to coalesce on.

Figure 12:
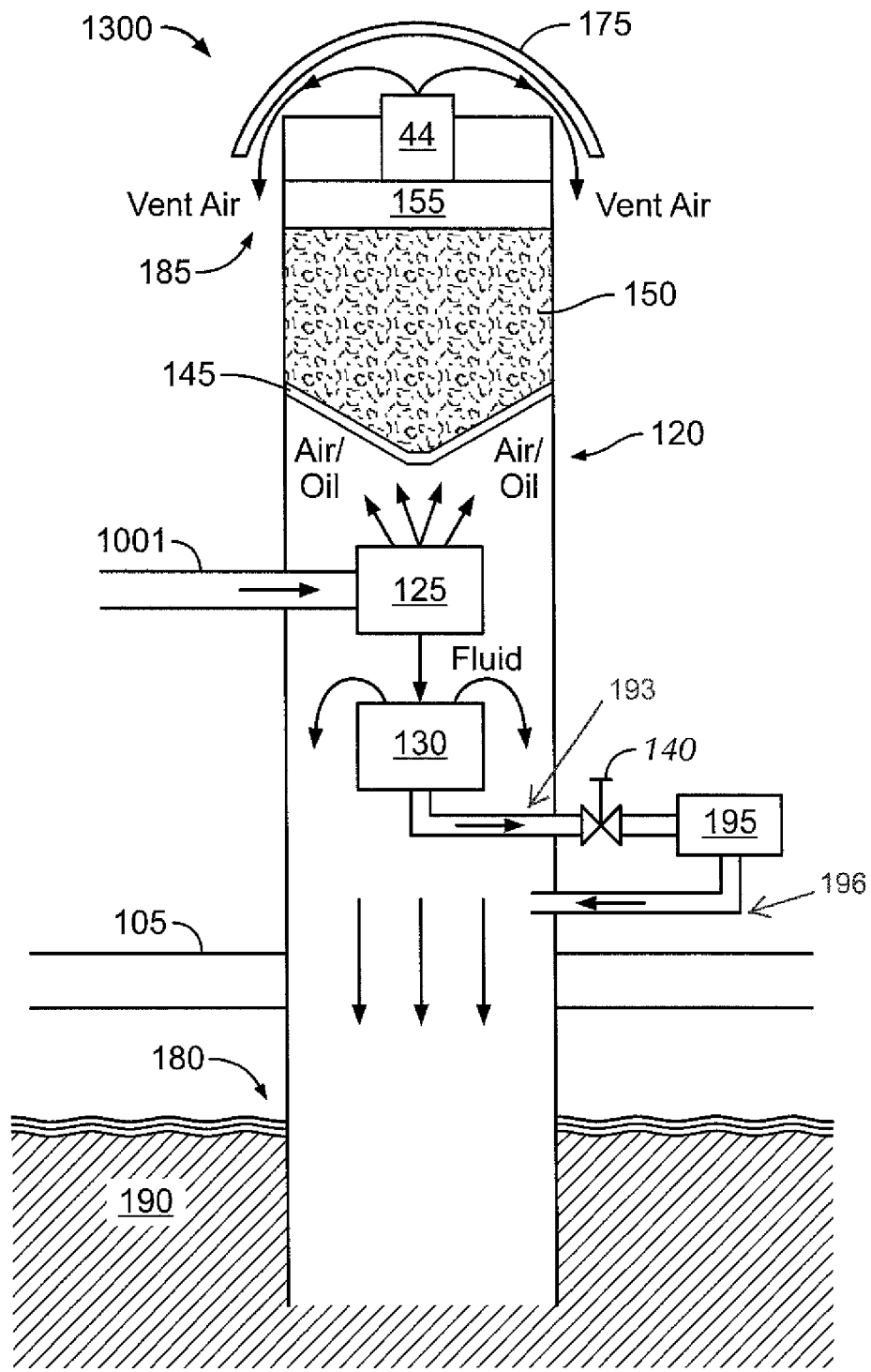
FIG. 12 is a schematic of a demisting system for use with the vibratory separator in accordance with embodiments disclosed herein.

Referring to FIG. 12, in other embodiments, the drilling fluid mixture exiting the pressure differential generator 44 (see FIG. 6) may be sent to a demisting system 1300 via the hose 1001 coupled to the coupling cam adapter 52. In other embodiments, the drilling fluid mixture from the sump 22 (see FIG. 1) may be sent to a demisting system 1300 via the hose 1001.

The demisting system 1300 may include a column 120 that receives the drilling fluid from the vibratory separator 10. The column 120 may include an outlet end 180 extending through a deck 105 into a fluid pit 190. The column 120 may also include a vent end 185 from which air may be vented. The vent end 185 of the column 120 may include a cover 175 that restricts objects or debris from entering the column 120 while allowing air to exit the column 120. The column 120 may be any vessel known to one skilled in the art used in the process of drilling fluid separation and formed of metal, composite, or other material as will be appreciated by a person having ordinary skill in the art. In some embodiments, a distance between the deck 105 and the cover 175 of the demisting system may be approximately four feet. However, one of ordinary skill in the art will appreciate that the distance between the deck 105 and the cover 175 may vary depending on, for example, a diameter of the column 120, desired volumetric fluid flow, etc. In other embodiments, the column 120 may extend approximately four feet below the fluid level 190. However, one of ordinary skill in the art will appreciate that the distance the column 120 may extend below the fluid level 190 may vary depending on, for example, a diameter of the column 120, desired volumetric fluid flow, etc.

In some embodiments, the demisting system 1300 may include at least one pressure differential generator 44 located near the vent end 185 of the column 120 to either help supplement the pressure differential generator 44 near the tray 25 or to provide a motive force for drawing the drilling fluid mixture to the column 120 and force the air/oil and the air alone upward toward the vent end 185 of the column 120. Multiple pressure differential generators 44 may operate concurrently. In other embodiments, the pressure differential generator 44 may be positioned at or near an inlet of the demisting system 1300, such as within the hose 1001. The fluid mixture from the vibratory separator 10 may enter the column 120 via the hose 101 and may continue to flow to a separation device 125. Separation device 125 may include one or more outlets in which air may exit into the column 120 and may include one or more outlets in which fluid may exit into the column 120. The separation device 125 may be any device known to one skilled in the art which may separate air from the fluid mixture and in which fluid may separate from the fluid mixture. Examples of separation device 125 may be, but are not limited to, a diffusion device, cyclone separators, centrifuges, and other equipment, are used to further separate air and fluid from a fluid mixture.

After exiting the separation device 125, air from the fluid mixture may enter the vent end 185 of the column 120. The air (or gas) may have oil (e.g., oil droplets) coupled thereto or entrained therein. The air/oil mixture may enter the vent end 185 of the column 120 with the air. The air/oil may be dispersed generally upward toward the vent end of the column 120. As the air/oil mixture travels upward toward the vent end 185 of the column 120, the air/oil mixture travels through a screen 145 and coalescing material 150. The screen 145 and coalescing material 150 may allow air to travel through it (e.g., upward toward the vent end 185 of the column 120), but provides a surface for the oil to impact, thus slowing the oil down and/or coalescing the oil. The screen 145 and coalescing material 150 may be any known screen or any known equipment known to one skilled in the art useful in the separation/coalescing of vapor/liquid mixtures, such as but not limited to, demisting pads, mesh wire or pads, vane mist eliminators, fiber mist eliminators, Raschig rings, and/or a steel wool pad-like material. The screen 145 and coalescing materials 150 may have a high surface area and/or a high void fraction. In some examples, the coalescing material 150 may include multiple layers of discs of loosely woven stainless fine wire.

The coalesced fluid may drain and/or drop downward back toward the separation device 125 and ultimately downward toward the fluid pit 190. As the air moves through the coalescing material 150, it may travel through another screen 155 and the air may vent out of the column 120. The screen 155 may allow air to travel through it (e.g., upward toward the vent end 185 of the column 120), but provides a surface for the oil to impact, thus slowing the oil down. The screen 155 may be any known screen or any known equipment known to one skilled in the art useful in the separation/coalescing of vapor/liquid mixtures, such as but not limited to, demisting pads, mesh wire or pads, vane mist eliminators, fiber mist eliminators, Raschig rings, and/or a steel wool pad-like material. Example screens 155 may have a high surface area and/or a high void fraction.

Figure 13:
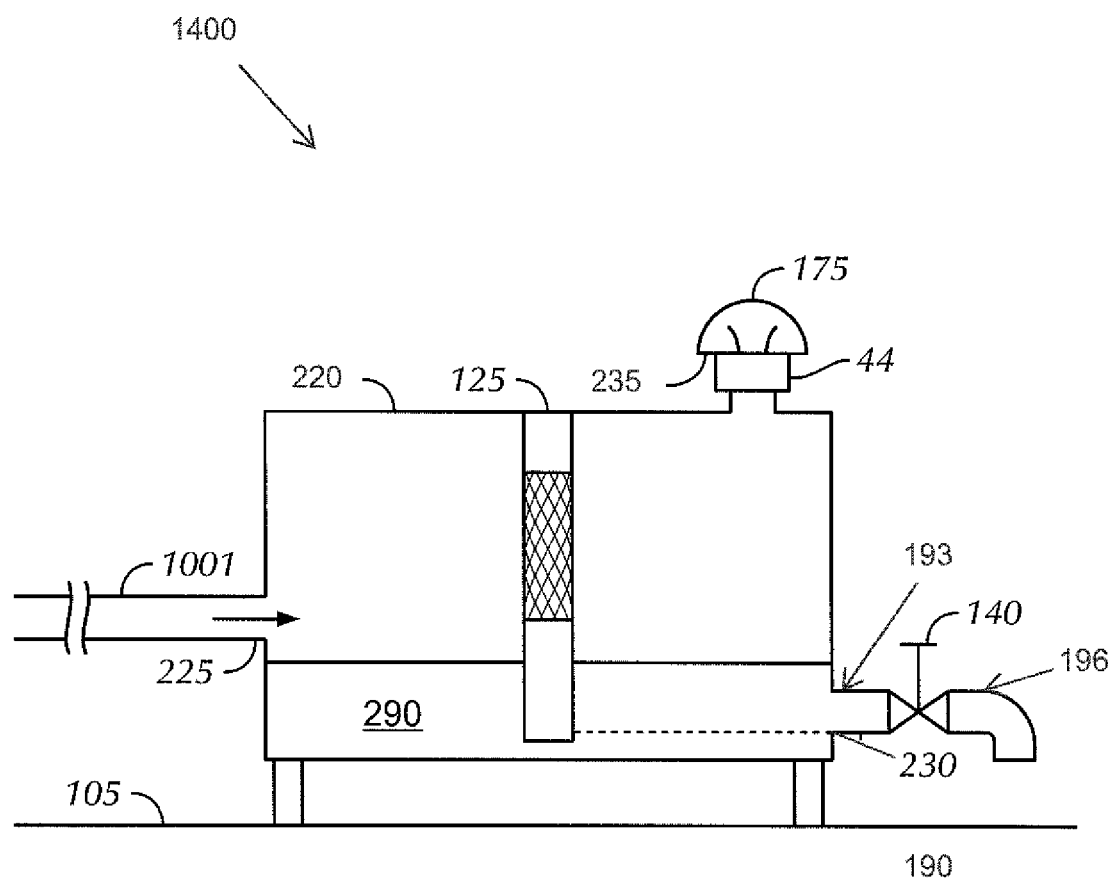
FIG. 13 is a schematic of a demisting system for use with the vibratory separator in accordance with embodiments disclosed herein.

After exiting the separation device 125, fluid from the fluid mixture may enter the outlet end 180 of the column 120 and with the assistance of gravity, the fluid may fall downward toward the fluid pit 190. As the fluid falls, a catch pot 130 disposed in the column 120 below the separation device 125 may catch at least a portion of the fluid. The catch pot 130 may or may not catch all of the fluid falling downward away from the separation device 125. The catch pot 130 may direct the caught fluid through a pipe or hose 193 and out of the column 120. The pipe or hose 193 may include a valve 140 which may allow or disallow the fluid to flow. A flowmeter 195 (inside and/or outside of the column 120) may measure the flow rate of the caught fluid through the pipe or hose 193 and the caught fluid may be directed back toward the fluid pit through a pipe or hose 196 (inside or outside the column 120), as shown in FIG. 13. Similarly, other measurement devices and/or sensors, such as temperature or viscosity, may measure or determine attributes of the caught fluid.

In other embodiments, the valve 140 may allow the caught fluid to exit the column 120 and into a container. In some examples, both a flowmeter 195 and a container may be included. The fluid captured in the container may allow an operator to sample and/or test the fluid. In other embodiments, an operator may determine flow rate of the fluid manually based on the flowmeter and/or fluid in the container over a certain time period.

Referring to FIG. 13, in another embodiment, the drilling fluid mixture exiting the pressure differential generator 44 (see FIG. 6) may be sent to a generally horizontal demisting system 1400 via the hose 1001 coupled to the coupling cam adapter 52. In other embodiments, the drilling fluid mixture from the sump 22 (see FIG. 1) may be sent to the demisting system 1400 via the hose 1001.

The demisting system 1400 may include a vessel 220 that receives the fluid mixture from the vibratory separator. The vessel 220 may be placed on a deck 105. An inlet 225 of the vessel 220 may be a minimum height of about 12 inches above the deck 105. However, one of ordinary skill in the art will appreciate that the minimum height if the inlet 225 of the vessel 120 may vary depending on, for example, a height or length of the vessel 220, desired volumetric fluid flow, etc.

Opposite the inlet 225 of the vessel 220 is an outlet 230 located near the bottom of the vessel 220 and a vent 235 located near the top of the vessel 220. The vent 235 of the vessel 220 may include a cover 175 that restricts objects or debris from entering the vessel 220 while allowing air to exit the vessel 220. In some embodiments, an optional pressure differential generator 44 may be coupled to the inlet of the vent 235 and exhaust through the cover 175. The pressure differential generator 44 may force the air/oil through a separation device 125. After passing through the separation device 125, the pressure differential generator 44 may force the air alone toward the vent 235 of the vessel 220. In this manner, the air/oil may move through a separation device 125 and the air alone (after the oil coalesces and drains) travels toward the vent 235 of the vessel 220 while the fluid travels toward the outlet 230 of the vessel 220. In some embodiments, the pressure differential generator 44 coupled to the vessel 220 may be in addition to the pressure differential generator 44 located upstream, such as coupled to the tray 25. The two pressure differential generators 44 may operate concurrently.

The outlet 230 of the vessel 220 may be coupled to a pipe or hose 193 including the valve 140 which may allow or disallow the fluid to flow to exit the vessel 220. A flowmeter (not shown) may be located downstream of the valve 140 to measure the flow rate of the fluid through a pipe or hose 196. In another embodiment, the valve 140 may allow the caught fluid to exit the vessel 220 and drain into a fluid pit 190.

After coalescing on the separation device or exiting the separation device 125, drilling fluid from the fluid mixture, with the assistance of gravity, may fall downward toward the outlet 230. In some embodiments, the vessel 220 catches the fluid falling downward away from the separation device 125 and a fluid level 290 may be established. The fluid level 290 extends across the entire length of the vessel 220. In some embodiments, the separation device 125 does not extend across the entire vessel 220 but extends at least below the outlet 230.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method comprising:
    disposing a fluid passage of a pressure differential generator between a first end of the pressure differential generator and a second end of the pressure differential generator that is opposite with respect to the first end of the pressure differential generator, wherein the pressure differential generator has a fluid inlet disposed between the first end and the second end of the pressure differential generator and in fluid communication with the fluid passage of the pressure differential generator;
    flowing fluid from a fluid source through the fluid inlet into an annular plenum chamber of the pressure differential generator;
    directing the fluid to the second end of the pressure differential generator by injecting the fluid from the fluid source into one or more nozzles;
    generating a pressure differential between a first area above a screen and a second area below the screen, thereby pulling a mixture of entrained air, vapor and a drilling fluid through the screen and into the fluid passage of the pressure differential generator, wherein the pressure differential is generated by the fluid from the fluid source flowing into the one or more nozzles;
    conveying the mixture from the screen through the fluid passage of the pressure differential generator to a chamber via a hose, wherein the conveying minimizes the misting of the mixture;
    submerging the hose within a fluid level in the chamber; and
    in response to a second pressure differential between the pressure differential generator and the chamber causing the mixture to flow in a reverse direction from the chamber toward the pressure differential generator via the hose, flowing the mixture through a port in the hose, wherein the port is configured to direct the mixture back to the chamber.

2. The method of claim 1, wherein the pressure differential generator is selected from the group consisting of an air amplifier, a line vacuum, and a vacuum generator.

3. The method of claim 1, wherein the port is configured to be perpendicular to the flow of the mixture in the hose.

* * * * *